(12) United States Patent
Hovstø et al.

(10) Patent No.: US 6,247,580 B1
(45) Date of Patent: Jun. 19, 2001

(54) ACTUATOR FOR A BI-DIRECTIONAL CONVEYOR BELT

(75) Inventors: Kenneth Hovstø, Heistad; Kjell Arne Gaarden, Herøya, both of (NO)

(73) Assignee: A/S Techno Track, Skien (NO)

( * ) Notice: Subject to any disclaimer, the term of this patent is extended or adjusted under 35 U.S.C. 154(b) by 0 days.

(21) Appl. No.: 09/423,238

(22) PCT Filed: Mar. 4, 1999

(86) PCT No.: PCT/NO99/00077

§ 371 Date: Nov. 5, 1999

§ 102(e) Date: Nov. 5, 1999

(87) PCT Pub. No.: WO99/44924

PCT Pub. Date: Sep. 10, 1999

(30) Foreign Application Priority Data

Mar. 5, 1998 (NO) ............................................ 1998 0962

(51) Int. Cl.$^7$ .................................................. B65G 39/16
(52) U.S. Cl. .......................................................... 198/806
(58) Field of Search ................................... 198/806, 807, 198/810.03

(56) References Cited

U.S. PATENT DOCUMENTS

| | | | |
|---|---|---|---|
| 3,065,646 | * | 11/1962 | Vance .................................... 198/806 |
| 3,593,841 | * | 7/1971 | Leow .................................... 198/806 |
| 3,621,728 | * | 11/1971 | Steorts, Jr. ........................ 198/806 X |
| 6,116,410 | * | 9/2000 | Malmberg ............................ 198/806 |

FOREIGN PATENT DOCUMENTS

| | | |
|---|---|---|
| 2069944 | 9/1981 | (GB) . |
| WO 97/23395 | 7/1997 | (WO) . |

* cited by examiner

*Primary Examiner*—James R. Bidwell
(74) *Attorney, Agent, or Firm*—Young & Thompson

(57) ABSTRACT

The actuator device for use in a bi-directional conveyor belt comprises a toothed wheel which rotates depending on the belt's transport direction and is engaged with a toothed rack on a toothed element which is movable between two extreme points and which has at each end portion a pin which, when a force is applied in the direction of the end of the toothed element, is arranged to move to a position in which it forms a tooth as an extension of the toothed rack, and when a force is applied in the direction of the opposite end of the toothed element is arranged to move to a retracted, yielding position relative to the toothed rack.

10 Claims, 5 Drawing Sheets

ACTUATOR FOR A BI-DIRECTIONAL CONVEYOR BELT

FIELD OF THE INVENTION

The invention relates to an actuator device for use in a bi-directional conveyor belt, wherein the actuator can assume two different positions depending on the belt's transport direction.

BACKGROUND OF THE INVENTION

The conveyor belt can be provided with different auxiliary devices, such as belt steering assemblies for holding the belt in a laterally correct position, scraping devices for scraping material in powdered form, or steering arms for steering small items such as cardboard boxes.

Some conveyor belts can be used in both directions, in which case it may be necessary to alter or switch the position of the auxiliary devices depending on the belt's transport direction.

In Norwegian patent application no. 962268 there is disclosed a reversible belt steering assembly for centering conveyor belts which comprises a rotating mechanism which is rotatable about an axis perpendicular to the conveyor belt and which supports at least one steering roller for the conveyor belt, and a first transfer mechanism which supports first guide rollers. The first guide rollers are steered laterally by the conveyor belt relative to the conveyor belt's longitudinal direction, and the first transfer mechanism by means of a lateral displacement of the conveyor belt from a neutral position transfers the first guide rollers' movement to the rotating mechanism for rotating the steering rollers to a position where they steer the conveyor belt back to the neutral position. The reversible belt steering assembly also comprises other guide rollers and a second transfer mechanism which corresponds to, and is arranged opposite to the steering rollers and corresponding to the first guide rollers and the first transfer mechanism. A switch mechanism connects and disconnects the first and second transfer mechanisms relative to the rotating mechanism, depending on the belt's transport direction.

Norwegian patent application no. 962268 thus describes an auxiliary device for conveyor belts which is connected and disconnected depending on the belt's transport direction.

The switching device which is employed in the above-mentioned and other auxiliary devices may be manual or automatic. In the case of conveyor belts which form part of automated transport systems, for example for granulated ores in processing plants, the switching devices must be automatic. Such automatic switching devices can be driven by hydraulic, pneumatic or electric motors or linear actuators, for example pneumatic cylinders, which are controlled by electrical signals from a control unit which also controls the belt's propulsion motor, or electrical signals directly from the propulsion motor. This can be done in a number of different ways, all of which entail installation of electric cables, connections and other electrical devices. Such installations are expensive, and may also involve undesirable maintenance, particularly in areas which are exposed to dust, humidity, heat or cold. Thus there is a need for a switching device which is not dependent on electrical, pneumatic or hydraulic installations.

SUMMARY OF THE INVENTION

The object of the invention is to provide an actuator device for use in a bi-directional conveyor belt, which actuator should be capable of assuming two different positions depending on the belt's transport direction, and of functioning without external connections.

This object is achieved according to the invention with an actuator device of the type mentioned in the introduction, characterized by the features which are stated hereafter.

The actuator according to the invention is assumed to have its primary application in switching auxiliary devices for conveyor belts. The actuator according to the invention, however, will also be able to be used for other purposes, for example as an indicator for the belt's transport direction or for controlling devices which are not connected to the conveyor belt, such as ventilating flaps.

BRIEF DESCRIPTION OF THE DRAWINGS

The invention will now be explained in more detail in connection with a description of a specific embodiment, and with reference to the drawing, in which.

DETAILED DESCRIPTION OF THE PREFERRED EMBODIMENTS

Figure 1:
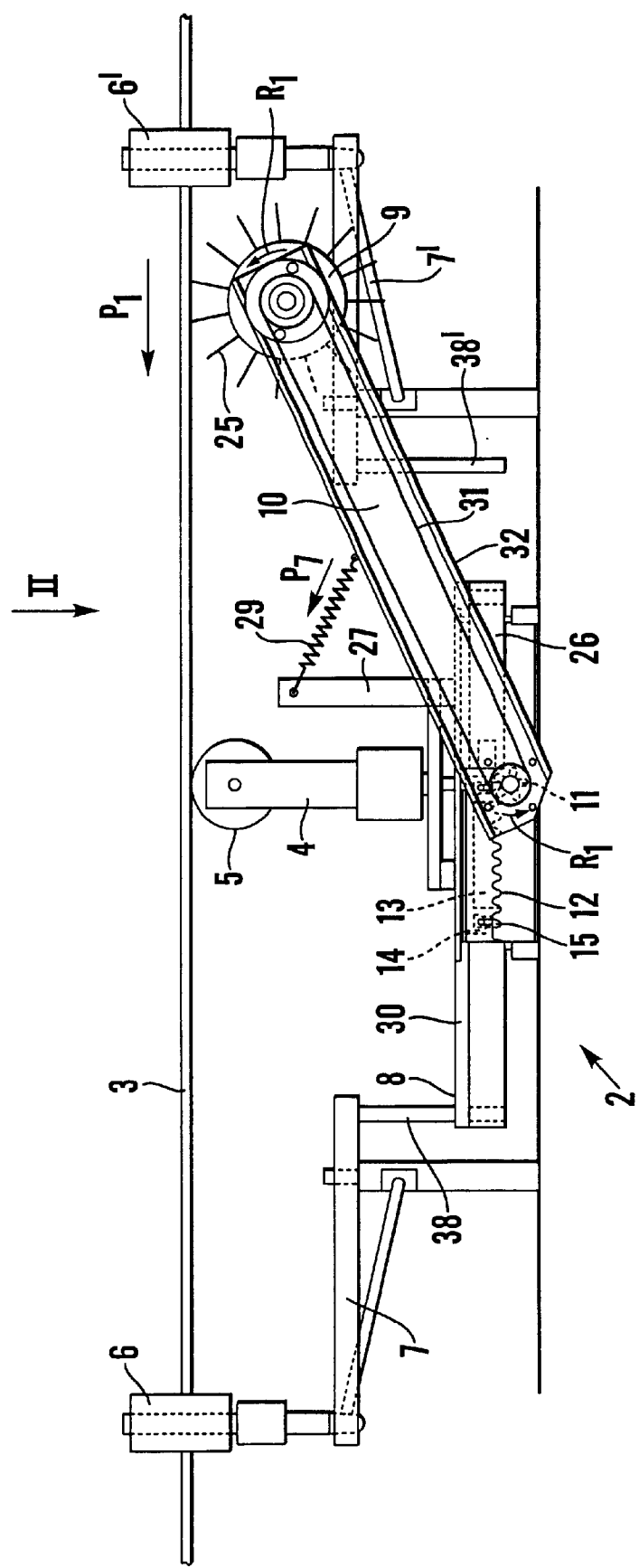
FIG. 1 illustrates a reversible belt steering assembly with an actuator according to the invention.

FIG. 1 illustrates a side view of a reversible belt steering assembly 2, i.e. a belt steering assembly which has the capacity to steer the conveyor belt in both transport directions. The belt steering assembly 2 is connected to a conveyor belt 3 which is movable in the direction $P_1$ and opposite $P_1$. The reversible belt steering assembly 2 comprises a steering mechanism 4 for lateral steering of the conveyor belt 3. This steering mechanism comprises a steering roller 5 which abuts against the underside of the belt 3 and can rotate freely about its axis. When the steering mechanism is not acting on the belt, the steering roller's axis is perpendicular to the belt's transport direction. When the belt is steered, the steering roller is rotated into an oblique position, thus causing the belt to move in a lateral direction.

The reversible belt steering assembly also comprises two sets of laterally movable position detectors 6 and 6' in the form of freely rotatable guide rollers which abut against the belt and follow it in the lateral direction. The two sets of position detectors are each connected to a transfer mechanism 7, 7', which comprises coupling rods 38, 38' which can be withdrawn from and moved into engagement with forks 8, 8', which in turn are connected to the steering mechanism 4, see FIG. 2. In the following description, reference to "left" and "right" position detector and transfer mechanism should be interpreted on the basis of FIG. 1.

FIG. 1 further illustrates a rotatable timing wheel 9 which is provided at the end of a rotation transfer device 10, which is rotatably mounted at its opposite end. A tightening device 29 in the form of a helical spring which is affixed to a bracket 27 pulls the rotation transfer device 10 in the direction $P_7$, thus causing the timing wheel 9 to be forced into abutment against the belt 3, absorbing rotational movement $R_1$ depending on the belt's transport direction $P_1$.

The rotation transfer device 10 is composed of a chain drive which is located inside a chain locker 32 and comprises two chain wheels which are connected to the timing wheel 9 or a toothed wheel 11 and an intermediate chain 31. The toothed wheel 11 consequently also acquires a rotational movement $R_1$ depending on the belt's transport direction $P_1$.

Figure 2:
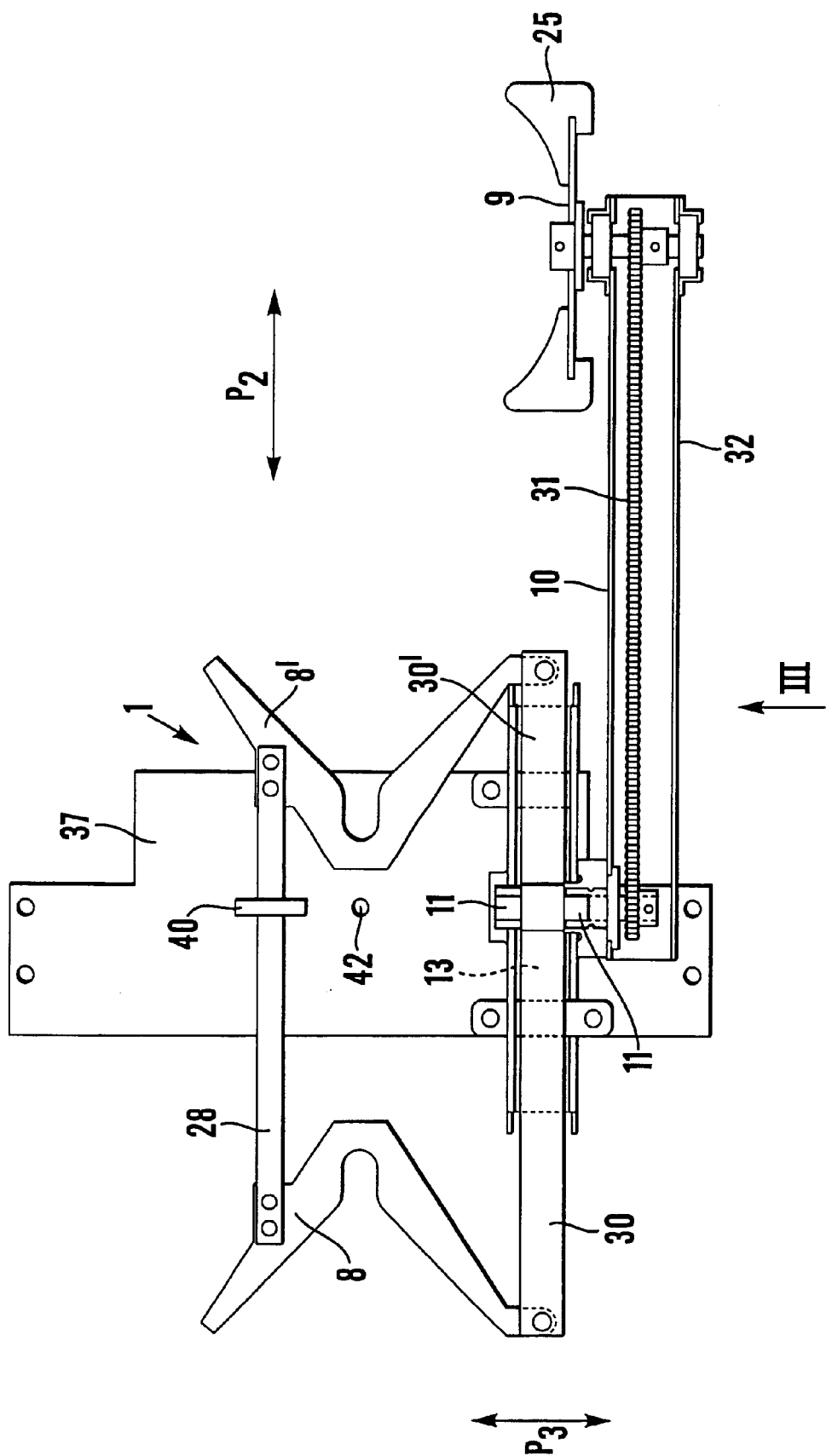
FIG. 2 illustrates the actuator according to the invention, viewed in the direction II in FIG. 1.
Figure 3:
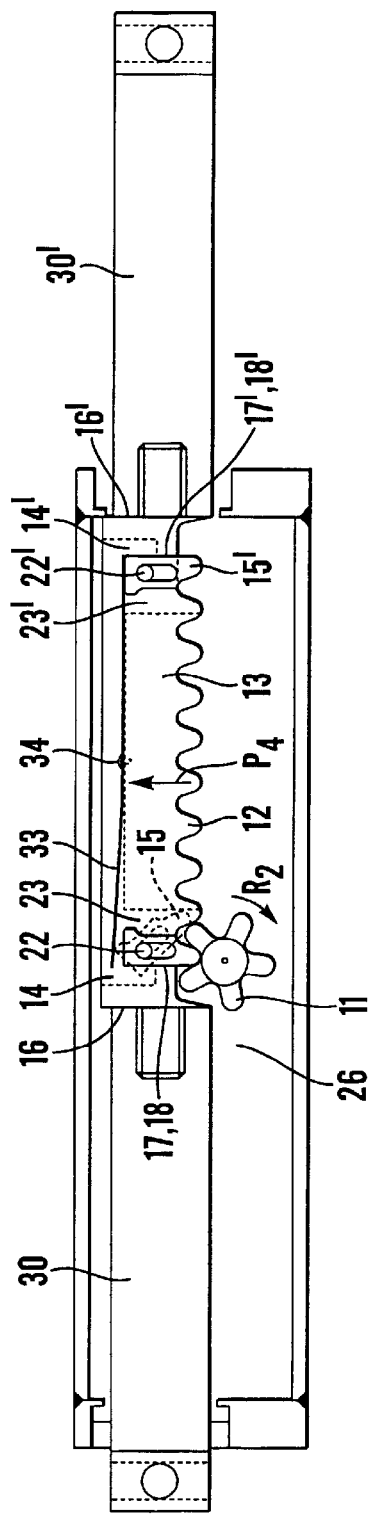
FIG. 3 illustrates a toothed bar inside a housing, viewed in the direction III in FIG. 2.

The toothed wheel 11 is engaged with a toothed rack 12 on a toothed element in the form of a toothed bar 13 which is movable in its longitudinal direction $P_2$ (see FIGS. 2 and 4 for definition of $P_2$) between a left extreme point illustrated in FIG. 1 and a right extreme point illustrated in FIG. 3. Since the toothed wheel's 11 direction of rotation is controlled by the belt's transport direction, the toothed bar's 12 movement is consequently also controlled depending on the belt's transport direction. By means of the movement of the toothed bar to the left extreme point, an activating function is performed by the fork 8 being brought into engagement with the coupling rod 38 while at the same time the fork 8' is brought out of engagement with the coupling rod 38'. By means of the movement of the toothed rod to the right extreme point a corresponding, opposite activating function is performed. In this manner the steering mechanism is influenced by one set of position detectors when the belt travels in one direction, and the other set of position detectors when the belt travels in the opposite direction.

At each end portion 14 the toothed bar includes a movable pin 15 which will be described in more detail with reference to the remaining figures. The toothed wheel 11 and the toothed bar 13 are shown exposed in FIG. 1 in order to explain the invention, but in an actual embodiment of the invention, however, these elements will preferably be located in an oil-filled chamber inside a housing 26.

FIG. 2 illustrates the above-mentioned devices viewed in the direction II in FIG. 1, which means viewed from above. It illustrates how the timing wheel is connected via a chain wheel to the chain 31, which in turn is connected via a chain wheel to the toothed wheel 11. The toothed wheel 11 and the toothed bar 13 are hidden by covers. The toothed bar 13 is directly connected to the forks 8, 8' via a fork stay 30, for movement in the direction $P_2$. A steering rod 28 which is steered laterally by a steering means 40 braces the forks and relieves the pressure on the connection between the fork stay and the forks. The various parts are attached to a bottom plate 37, which is rotatable about an axis of rotation 42 and attached to the steering mechanism 4. A lateral displacement of the coupling rods 38, 38' in the direction $P_3$ will influence the forks 8, 8' and be transferred to the steering mechanism 4 as a rotation about the axis of rotation 42.

FIG. 3 illustrates the toothed bar and the toothed wheel inside the housing 26, viewed in the direction III in FIG. 2, i.e. as in FIG. 1. The toothed bar is identical at both ends, even though it does not need per se to be so. The parts and portions which are located at the end of the toothed bar which is illustrated on the left of FIG. 2 are indicated without marks, while corresponding parts and portions which are located at the end of the toothed bar which is illustrated on the right of the figure are indicated with marks ('). In order to avoid overloading the presentation with reference numerals, from now on the various parts and portions will only be indicated with a mark where this is necessary for explaining the invention.

The toothed element, i.e. the toothed bar 13, has at each end portion 14 a pin 15 which, when force is applied in the direction of the end 16 of the toothed bar, is arranged to move to a position where it forms a tooth as an extension of the toothed rack 12, and which, when force is applied in the direction of the opposite end 16' of the toothed bar, is arranged to move to a retracted, yielding position relative to the toothed rack 12.

The position of the pin 15 in which it forms a tooth as an extension of the toothed rack 12 is illustrated in FIG. 3 at both ends of the toothed bar 13, while the retracted, yielding position of the pin is only illustrated at the left-hand end of the toothed bar.

In order to explain the actuator's mode of operation it is assumed that the belt 3 moves initially in the direction $P_1$, see FIG. 1, and the timing wheel 9 and the toothed wheel 11 thereby rotate as explained in the direction $R_1$. It will be realised that as a result of the belt's travel in the direction $P_1$, the toothed wheel 11 is located at the right-hand end of the toothed bar 13, or more correctly: the toothed wheel has moved the toothed bar to its left extreme point, with the result that the left transfer mechanism 7 and the left set of position detectors 6 are connected to the steering mechanism 4.

For an external reason, which is immaterial to the invention, the belt's transport direction is altered to opposite $P_1$. The timing wheel's and consequently the toothed wheel's rotation is thereby altered to opposite $R_1$, i.e. $R_2$. As a result of the rotation in the direction $R_2$, teeth on the toothed wheel 11 (which is still located at the toothed bar's right-hand end) influence the pin 15' with a force which acts in the direction of the toothed bar's right-hand end 16', and the pin 15' is moved to the position where it forms a tooth as an extension of the toothed rack 12. The toothed wheel's further rotation in the direction $R_2$ causes the toothed wheel's teeth to grip the teeth in the toothed rack 12, forcing them towards the right, with the result that the toothed bar 13 is moved to its right extreme point, as illustrated in FIG. 3, performing an activating function.

The toothed wheel 11 is now located at the left-hand end of the toothed bar 13, outside the toothed rack 12, in the area of the pin 15. It is assumed that the belt's travel in the direction opposite $F_1$ is sustained, and the toothed wheel 11 thereby continues to rotate in the direction $R_2$. The rotation causes the toothed wheel's teeth to constantly touch the pin 15, influencing it with a force in the direction of the toothed bar's right-hand end 16'. The toothed bar's right-hand end 16' is the toothed bar's opposite end relative to the pin 15, and the pin 15 thereby moves to the retracted, yielding position. In this position the pin yields every time a tooth from the toothed wheel touches the pin, thus permitting the toothed wheel to rotate freely in the direction $R_2$ without gripping the pin. Thus "the end of the toothed bar" and "the opposite end of the toothed bar" should be understood on the basis of which of the pins 15, 15' is being considered.

Figure 4:
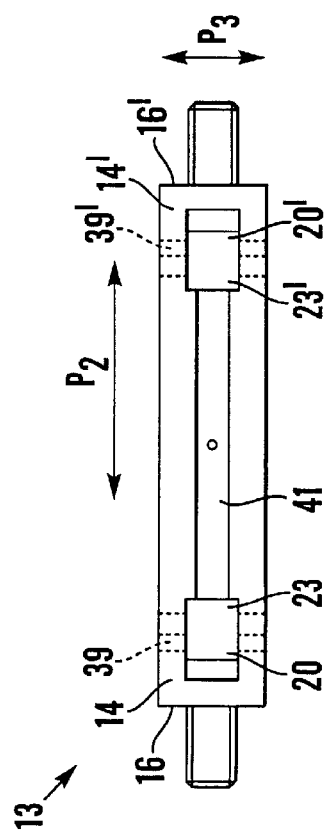
FIG. 4 illustrates the toothed bar viewed in the direction II in FIG. 1.

FIG. 4 illustrates the toothed bar 13 viewed in the direction II in FIG. 1, i.e. from above. Here it can be seen how each of the toothed bar's end portions 14 is provided with a cavity 20 as an extension of the toothed rack 12. The cavity 20 has a rectangular shape, thus enabling it to accommodate the pin 15. It will thereby be understood that the pin 15 has a width in the toothed bar's transverse direction $P_3$ which is less than the width of the toothed bar. FIG. 4 also shows a hole 39 for a rotating pin and a recess 41 for a laminated spring, which will be discussed later.

Figure 5:
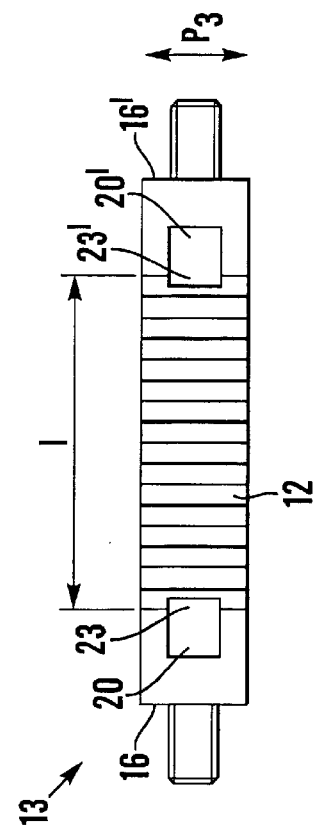
FIG. 5 illustrates the toothed bar viewed opposite the direction II in FIG. 1.

FIG. 5 illustrates the toothed bar viewed opposite the direction II in FIG. 1, i.e. from below. Here it can be seen how the toothed rack 12 in the transverse direction $P_3$ has a width which corresponds to the width of the toothed bar 13. It further illustrates how the toothed rack 12 in the toothed bar's longitudinal direction $P_2$ has a length l which is less than the toothed bar's length, which is also illustrated in the other figures, especially FIG. 3.

FIGS. 4 and 5 also illustrate recesses 23 in the ends of the toothed rack 12. These recesses have the same width as the cavity 20, and form part of it. The purpose of the recess 23 is to accommodate the pin 15 when it is located in the retracted, yielding position. The toothed wheel 11 has a width which is greater in the transverse direction $P_3$ than the width of the recess 23, and in fact also greater than the width of the toothed bar 13 (see FIG. 2), with the result that the toothed wheel's teeth can also grip the toothed rack 12 in the area of the recess 23.

Figure 6A:
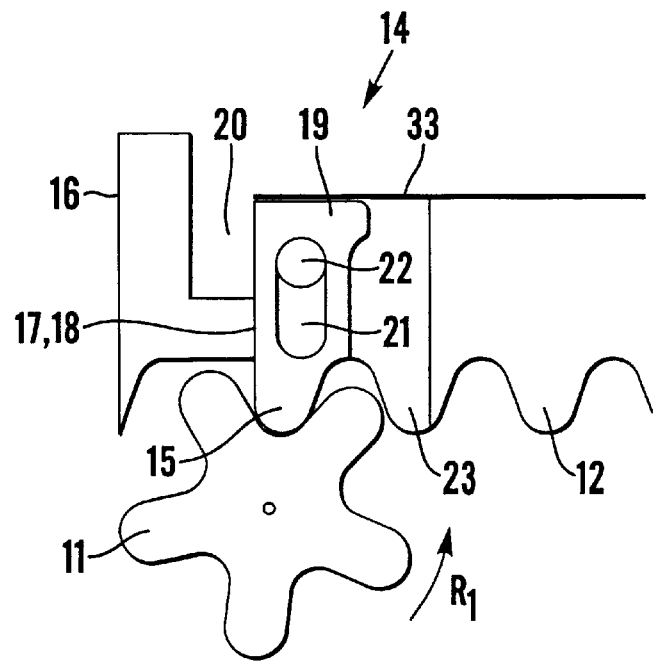
FIGS. 6a and b illustrate an embodiment of an end portion of the toothed bar with a toothed wheel and a pin FIGS. 7a and b illustrate a second embodiment of an end portion of the toothed bar with a toothed wheel and a pin.
Figure 6B:
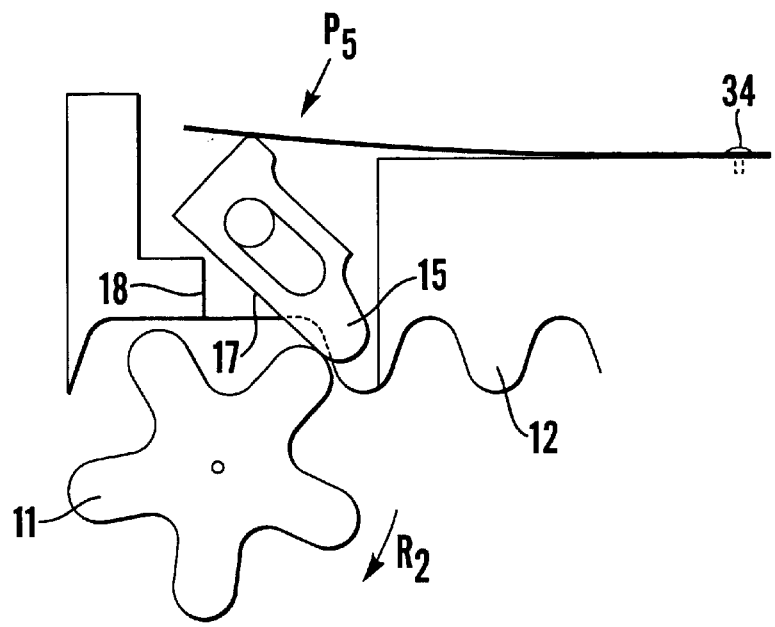

FIGS. 6a and b illustrate the toothed bar's end portion 14 with the pin 15 in closer detail, with the toothed wheel 11 in rotation in the direction $R_1$ and $R_2$ respectively. In FIGS. 6a and b the pin is consequently located in the position in which it forms a tooth as an extension of the toothed rack 12 and in the retracted, yielding position respectively. It illustrates how, on a side which faces the end 16 of the toothed bar, the pin 15 has a contact portion 17 for abutment against a corresponding contact portion 18 provided on the toothed bar 13. When the pin 15 is located in the position in which it forms a tooth in extension of the toothed rack 12 it is thereby kept immobile against the toothed bar.

FIGS. 6a and b illustrate how the pin 15 forms part of an attachment portion 19 which is rotatably attached to the toothed bar 13 for rotating about an axis in the toothed bar's transverse direction $P_3$, which attachment portion 19 is also movably attached to the toothed bar 13 for moving in the toothed bar's depth direction $P_4$ (see FIG. 3 for definition of $P_4$). This is accomplished by the attachment portion 19 having an elongated hole 21 which extends in the toothed bar's transverse direction $P_3$ (see FIG. 4), and which, when the pin is located in the position in which it forms a tooth as an extension of the toothed rack, has a longitudinal direction which is coincident with the toothed bar's depth direction $P_4$. A corresponding rotating pin 22 is securely fastened to the toothed bar 13 through the hole 39 (see FIG. 4) and extends through the cavity 20 and the elongated hole 21.

FIGS. 6a and b also illustrate the recess 23, which forms part of the cavity 20. It can be seen how, when it is located in the retracted, yielding position, the pin 15 is rotated into the cavity by a tooth on the toothed wheel. The ability of the attachment portion 19 to move in the toothed bar's depth direction $P_4$ ensures that the toothed wheel is not wedged against the pin. A laminated spring 33, which extends in the toothed bar's longitudinal direction and is located in the depression 41 in the toothed bar, being affixed thereto by a pin 34, see FIGS. 3 and 4, acts on the pin 15 with a force in the direction $P_5$, forcing it towards the position in which it forms a tooth as an extension of the toothed rack 12.

Figure 7A:
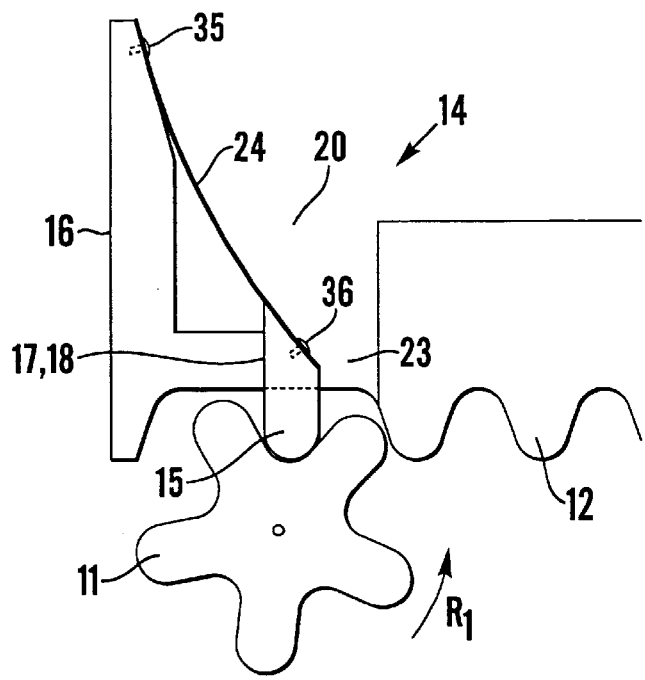
Figure 7B:
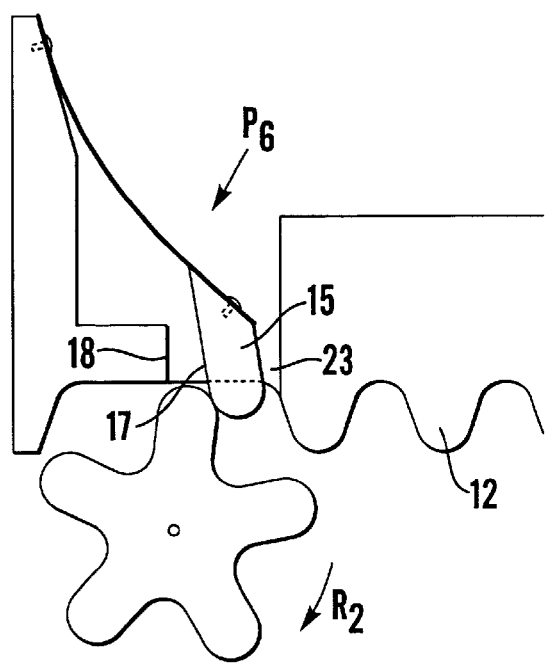

FIGS. 7a and b illustrate a second embodiment of the toothed bar's end portion 14. The toothed wheel 11 is of the same type as in the preceding figures, and is shown during rotation in the direction $R_1$ and $R_2$ respectively, the pin thereby assuming the position in which it forms a tooth as an extension of the toothed rack and is located in the retracted, yielding position respectively. Here the pin 15 forms part of an elastic, elongated attachment portion 24 which is attached to the pin 15 by a pin 36 and to the toothed bar by a pin 35. As in the above-described embodiment the pin has a contact portion 17 for abutment against a corresponding contact portion 18 provided on the toothed bar, in order to keep the pin immobile when it is located in the position in which it forms a tooth in extension of the toothed rack 12. The elastic attachment portion 24 provides an elastic, rotatable attachment of the pin, with the result that, when under the influence of the toothed wheel's teeth during the rotation of the toothed wheel in the direction $R_2$, the pin is permitted to be rotated into the recess 23. The elastic attachment portion also provides a spring-loading of the pin 15 in the direction $P_6$ towards the position in which it forms a tooth in extension of the toothed rack 12, with the result that the pin returns to this position when it is no longer under the influence of the toothed wheel's teeth during the toothed wheel's rotation in the direction $R_2$.

A number of variants of the pin's attachment to the toothed rod are possible, both with regard to the rotatable attachment, the movable attachment and the spring-loading. The pin may, for example, be provided with a transverse pin which can slide in a groove in the toothed rod's depth direction $P_4$, permitting both rotation and movement, while at the same time the pin can be spring-loaded by a compression spring in the direction of the position in which it forms a tooth as an extension of the toothed rack 12.

The timing wheel can be designed in different ways. In FIG. 1 there is illustrated a timing wheel 9 which is provided with elongated wings 25 for absorbing the belt's 3 movement, which wings are advantageous, particularly in those cases when the belt is running unevenly. An example of another embodiment, which may be employed when the actuator is used together with the belt steering assembly in FIG. 1, is to use the steering roller 5 as a timing wheel. The rotation transfer device may also be implemented in a number of different ways, such as by means of toothed wheels, V-belts, toothed belts or worm drive.

The toothed element may also be designed in different ways, and need not be composed of a straight toothed bar. The toothed element may, for example, be in the form of a rotatably mounted segment of a circle, which can be connected to a link arm which forms part of a mechanism.

What is claimed is:

1. An actuator device for use in a bi-directional conveyor belt (3), wherein the actuator device can assume two different positions depending on the belt's transport direction ($P_1$), characterized in that it comprises a rotatable timing wheel (9) in abutment against the belt (3) for absorbing rotational movement ($R_1$) depending on the belt's transport direction ($P_1$), and a rotation transfer device (10) for transferring the timing wheel's rotational movement ($R_1$) to a toothed wheel (11) which is engaged with a toothed rack (12) on a toothed element which is movable between two extreme points for implementing an activating function, and that at each end portion (14) the toothed element (13) has a pin (15) which, when a force is applied by the toothed wheel (11) to the pin and that force includes a force component in the direction of a first end (16) of the toothed element, moves to a position in which it forms a tooth as an extension of the toothed rack (12), and when a force is applied by the toothed wheel (11) to the pin and that force includes a force component in the direction of a second opposite end (16') of the toothed element, moves to a retracted, yielding position relative to the toothed rack (12).

2. A device according to claim 1, characterized in that on a side which faces the end (16) of the toothed element the pin (15) has a contact portion (17) for abutment against a corresponding contact portion (18) provided on the toothed element (13), in order to keep the pin (15) immobile when it is located in the position in which it forms a tooth as an extension of the toothed rack (12).

3. A device according to claim 1, characterized in that the pin (15) forms part of an attachment portion (19) which is rotatably attached to the toothed element (13) for rotation about an axis in the toothed element's transverse direction ($P_3$).

4. A device according to claim 1, characterized in that the pin (15) forms part of an attachment portion (19) which is movably attached to the toothed element (13) for displacement in the toothed element's depth direction ($P_4$).

5. A device according to claim 1, characterized in that the pin (15) is provided in a cavity (20) in the toothed element provided as an extension of the toothed rack (12).

6. A device according to claim 1, characterized in that the pin (15) forms part of an attachment portion (19) which has an elongated hole (21) extending in the toothed element's transverse direction ($P_3$) and, when the pin is located in the position in which it forms a tooth as an extension of the toothed rack, has a longitudinal direction which is coincident with the toothed element's depth direction ($P_4$), and that a corresponding rotating pin (22) is securely fastened to the toothed element (13), extending through the cavity (20) and the elongated hole (21).

7. A device according to claim 1, characterized in that the toothed rack (12) has recesses (23) at its ends to accommodate the pin (15) when it is located in the retracted, yielding position.

8. A device according to claim 1, characterized in that the pin (15) forms part of an elastic attachment portion (24) which is attached to the toothed element (13).

9. A device according to claim 1, characterized in that the pin (15) is spring-loaded in the direction of the position in which it forms a tooth as an extension of the toothed rack (12).

10. A device according to claim 1, characterized in that the timing wheel (9) is provided with elongated wings (25) for absorbing the belt's (3) movement.

* * * * *